United States Patent Office 3,048,538
Patented Aug. 7, 1962

3,048,538
WATER-BASED DRILLING FLUID HAVING ENHANCED LUBRICATING PROPERTIES
Milton Rosenberg and Paul William Schaub, Pittsburgh, Pa., assignors to Gulf Research & Development Company, Pittsburgh, Pa., a corporation of Delaware
No Drawing. Filed May 8, 1959, Ser. No. 811,805
8 Claims. (Cl. 252—8.5)

This invention relates to drilling muds having extreme pressure lubricating properties and more particularly to a method and drilling mud compositions for counteracting the effects of calcium on water base drilling muds.

It has been found that the incorporation of certain additives such as the fatty acids having more than 8 carbon atoms per molecule, the alkali metal soaps of those fatty acids, sulfurized fatty acids, and sulfurized alkali metal soaps of the fatty acids will impart extreme pressure lubricating properties to water base drilling muds when added to the drilling muds in concentrations, preferably of the order of about three percent or less. The improved lubricating properties of the drilling muds result in greatly increased life of the bits used in rotary drilling. Another benefit obtained by the incorporation of the additives is a marked reduction in the torque required to rotate the bit.

When the drilling muds containing fatty acids, sulfurized fatty acids, and soaps of the sulfurized and non-sulfurized fatty acids are contaminated with calcium ions, curds of an insoluble calcium soap are formed and separate from the drilling mud. This "greasing out" of the calcium soap seriously interferes with control of the mud system. If the greasing out of the insoluble calcium soap occurs in drilling muds containing weighting agents, such as barite, used to increase the density of the mud, the greating out causes agglomeration of the weighting agent, which then sinks to the bottom of the mud pit, and is lost from the mud system. The resulting loss of mud density may cause the well to blow out. If the drilling mud is free of weighting agents the resulting insoluble soap floats on the surface of the mud in the mud pit. The insoluble calcium soap also plugs the shale shaker and thereby interferes with the separation of the cuttings from the drilling mud. The extreme pressure additive then is not picked up by the mud pumps and incorporated in the drilling mud circulated to the bit to provide the desired lubricating effect.

Calcium in concentrations high enough to cause the greasing out may enter the drilling mud from many sources. Frequently drilling muds contain substantial concentrations of calcium ions. In some muds, generally referred to as calcium treated muds, calcium is added to the mud to control its viscosity and gel strength. Calcium may also enter the mud as a contaminant from formations, for example anhydrite and gypsum formations, encountered during the drilling. Sometime brines encountered during the drilling of a well contain sufficiently high concentrations of calcium to cause the greasing out, as may the water available in some areas for making up drilling muds.

This invention resides in water base drilling mud compositions containing fatty acids, rosin acids, alkali metal soaps of fatty acids and rosin acids and the sulfurized derivatives of the compounds named above in concentrations sufficient to impart extreme pressure lubricating properties to the drilling muds. The drilling mud compositions also contain calcium ions in concentrations sufficient to react with the lubricating additive and form insoluble calcum soaps. In this invention, dispersing agents are incorporated in the drilling muds to disperse the insoluble calcium soaps and prevent their separation to interfere with drilling processes. This invention also contemplates a method of treating water base drilling muds to avoid the harmful effects of calcium ions on the lubricating additives incorporated in the muds.

The water base drilling muds of this invention may be substantially free of clay solids or may contain clay solids in concentrations up to as high as about 25 percent by volume of the drilling mud. In those drilling muds containing clay solids the concentration of the solids will depend upon their source. If bentonite, for example, is added to the drilling mud to give it desired properties, the concentration is of the order of about 1 to 8 percent. If the clay solids present in the drilling mud are inactive clays picked up from the formations penetrated during the drilling, the concentration of clay solids may be as high as the upper limit set forth above. The drilling muds may contain weighting agents such as barite and other mud additives conventionally incorporated in drilling muds to give the muds the desired properties.

The term "water base" is used in describing the drilling muds of this invention to distinguish those muds from oil-in-water emulsion drilling muds and oil base drilling muds. Oil-in-water emulsion drilling muds contain 5 to 40 percent, and preferably about 10 to 15 percent, petroleum oils such as crude oil, gas oil, or diesel oil which have been added to a water base drilling mud to alter characteristics of the water base drilling mud. A principal purpose of adding oil to a water base drilling mud to form an oil-in-water emulsion drilling mud is to increase the drilling rate. Hydrocarbon oils have also been added to improve the lubricating characteristics of the drilling mud. The presence of a separate oil phase has been believed to be necessary for a marked improvement in the lubricating properties of the drilling mud to be obtained by the addition of additives. It was believed that the additive causing the improved load carrying characteristic was carried principally in the oil phase and that phase preferentially wet the metal surfaces. It is an important advantage of this invention that water base drilling muds having excellent lubricating properties can be prepared without adding a hydrocarbon oil to the drilling mud.

This invention is useful with drilling muds containing those additives incorporated in the mud to improve its extreme pressure lubricating properties which, when the mud contains calcium ions, will result in the formation of insoluble soaps of calcium which separate from the liquid phase of the drilling mud. Examples of such additives are fatty acids having at least 8 to 20 carbon atoms per molecule, rosin acids, sulfurized rosin acids, and the alkali metal soaps of fatty acids, sulfurized fatty acids, rosin acids, and sulfurized rosin acids. The compounds listed above which are incorporated in the drilling muds to improve the lubricating properties are described and claimed in application Serial No. 737,494, filed May 26, 1958, by Milton Rosenberg entitled "Process;" application Serial No. 783,665, filed December 30, 1958, by Milton Rosenberg entitled "Composition and Method"; and application Serial No. 698,925, filed November 26, 1957, now abandoned, by Rodolfo J. Tailleur entitled "Process." The lubricating additives are incorporated in the drilling muds in concentrations ranging from about 0.25 percent to 3.0 percent. Higher concentrations can be used but generally result in little improvement in the lubricating properties.

The calcium ions in the drilling mud causing the formation of the insoluble curds of calcium soap may be derived from many sources. Thus, the calcium may have been added to the drilling mud to give the drilling mud desired properties entirely separate from its lubricating properties. Calcium may have been introduced into the drilling mud as a contaminant as the result of penetrating formations containing calcium or encountering brines containing calcium during the drilling operation. Regardless of the source of the calcium, it will cause the formation and separation of the insoluble calcium soaps when present in an available form in the liquid phase of the drilling mud in concentrations in excess of about 150 p.p.m. If the calcium is present in a combined form in which it is not available it may not cause the undesirable formation and separation of the insoluble calcium soaps even though the concentration in the liquid phase is higher than 150 parts per million. For example, calcium lignosulfonate may be present in the drilling muds in concentrations in which it is normally used without causing the separation of the insoluble soap.

The separation of the insoluble calcium soaps from the liquid phase of the drilling mud is prevented in this invention by the incorporation of a material in the mud which will disperse the soap that is formed. One group of compositions that have been found to be effective in preventing greasing out are generally defined non-ionic surface active agents. Non-ionic surface active agents which have been found to be effective are polyoxyethylene derivatives of alkyl phenols, for example, polyoxyethylene derivatives of nonyl phenol; polyoxyethylene derivatives of alkyl glycols, for example polyoxyethylene derivatives of polypropylene glycols; and polyoxyethylene derivatives of anhydroalkitol esters such as polyoxyethylene derivatives of sorbitan esters of tall oil. The dispersion of the calcium soap can also be accomplished by incorporating small amounts of hydrocarbon oils such as crude oil, kerosene, diesel oil, etc. in the drilling mud.

The action of the non-ionic surface active agent and the oil are somewhat different in the mechanism by which they accomplish the dispersion. When the non-ionic surface active agents are employed, the soap appears to remain as a solid but is suspended in a stable dispersed phase in the drilling mud. When oil is added to the drilling mud to disperse the calcium soap, the calcium soap appears to go into solution in the oil and a loose emulsion of oil in the water base drilling mud is formed.

The dispersion of the calcium soap to prevent its greasing out with the attendant difficulties in drilling is not merely a matter of adding an emulsifier. It is interesting that many of the additives incorporated in the drilling mud to improve its lubricating properties are themselves generally considered to be emulsifiers. Moreover, most emulsifiers are not effective. For example, cationic and anionic surface active agents do not disperse the soap. Some of the non-ionic surface active agents also are not effective. In general where the non-ionic surface active agent contains a polyoxyethylene group, increasing the molecular weight of the group increasse its effectiveness. Inorganic emulsifiers such as sodium metaborate which are effective in forming a stable emulsion of tall oil in water are ineffecitve in dispersing the calcium soap. Sodium tallate in particular is widely used as an emulsifier in drilling muds but is a source of, rather than a cure for, the greasing out difficulty.

Specific examples of non-ionic surface active agents that have been found to be effective are:

(1) DME—a polyoxyethylene derivative of nonyl phenol sold by Antara Chemicals Division of General Aniline and Film Corp.

(2) Igepal CO 710, 850, 880, 990—a series having the same general composition also sold by Antara.

(3) Drilling Milk—an emulsifier sold for use in oil-in-water emulsion drilling muds—a polyoxyethylene derivative of sorbitan ester of tall oil sold by Atlas Powder Company.

(4) Pluronics F 68, F 77, F 88, P 65, P 66, P 75, P 84, P 85, L 64, L 42, L 43, L 44, L 72—condensation products of ethylene oxide and polypropylene glycol.

The dispersant selected to cure the difficulty wtih greasing out of the calcium soap will depend upon the particular mud system employed. The non-ionic surface active agents are most useful when the water base drilling mud is water substantially free of clay solids. The incorporation of the hydrocarbon oil, is effective in the water base drilling muds substantially free of clay solids but is preferred in drilling muds containing substantial concentrations of clay. When the hydrocarbon oil is added to a water base fluid substantially clay solids-free, the addition of the non-ionic surface active agent will stabilize the resultant emulsion of the hydrocarbon solution of calcium soap and water phases.

The non-ionic surface active agents are incorporated in the drilling mud in concentrations in the range of about 0.2 to 2 pounds per barrel to sufficiently disperse the calcium soap in the mud. Higher concentrations can be employed but increase the cost of the drilling mud without a commensurate improvement in the properties of the drilling mud. However, care must be taken in the incorporation of higher concentrations of some non-ionic surface active agents in the mud or the improved lubricating characteristics of the mud may be lost. Moreover, in some instances the presence of high concentrations of non-ionic surface active agents such as DME in mud systems containing substantial concentrations of clay solids may cause gelling of the mud.

The hydrocarbon oils are added to the mud in quantities to give an oil concentration in the range of about ½ to 2 percent. Higher concentrations of the hydrocarbon oils can be incorporated in the drilling mud but generally serve no useful purpose in overcoming the difficulty with greasing out of the calcium soaps.

It is preferred to incorporate the dispersant in the drilling mud before separation of calcium soaps from the drilling mud occurs. However, drilling may be commenced with the drilling mud containing the lubricating additive and the addition of the dispersant delayed until there are indications of separation of calcium soaps.

Laboratory tests of drilling mud compositions were made to determine the effectiveness of dispersants in dispersing calcium soaps. The test procedure was to mix water, non-ionic emulsifier, and the lubricating additive. Then dry calcium sulfate was added to the mixture. If greasing out occurred, a separate layer of calcium soap was readily observed. When the dispersant was effective there was no layer. The concentrations in the following examples are based on a barrel of water.

*Example 1*

2.1 lbs./bbl. of DME and 6 lbs./bbl. of sulfurized tall oil (5% sulfur) were mixed with water. 2 lbs./bbl. of calcium sulfate were then added to the mixture. No greasing out occurred.

*Example 2*

1 lb./bbl. of Drilling Milk and 6 lbs./bbl. of sulfurized tall oil (3% sulfur) were mixed with water. 2 lbs./bbl. of calcium sulfate were added to the mixture. No greasing out occurred.

*Example 3*

1 lb./bbl. of Igepal CO 850 and 6 lbs./bbl. of sulfurized tall oil (3% sulfur) were mixed with water. 2 lbs./bbl. of calcium sulfate were then added to the mixture. No greasing out occurred.

*Example 4*

1 lb./bbl. of Pluronic F 88 and 6 lbs./bbl. of sulfurized tall oil (3% sulfur) were mixed with water. 2 lbs./bbl. of calcium sulfate were then added to the mixture. No greasing out occurred.

*Example 5*

1 lb./bbl. of DME and 3½ lbs./bbl. of tall oil were mixed with water. 2 lbs./bbl. of calcium sulfate were then added to the mixture. No greasing out occurred.

*Example 6*

2% by volume of diesel fuel and 6 lbs./bbl. of sulfurized tall oil (3% sulfur) were mixed with water. 2 lbs./bbl. of calcium sulfate were added to the mixture. A small amount of supernatant oily liquid was formed. ½ lb./bbl. of sodium metaborate was used to emulsify the EP additive. Sodium metaborate itself does not prevent greasing out.

We claim:

1. A water-base drilling fluid having extreme pressure lubricating properties consisting essentially of water and an extreme pressure lubricant additive selected from the group consisting of fatty acids having at least 8 carbon atoms per molecule, sulfurized fatty acids having at least 8 carbon atoms per molecule, alkali metal soaps of fatty acids and alkali metal soaps of sulfurized fatty acids, available calcium ions in a concentration above about 150 parts per million high enough to form insoluble curds of calcium soap, and a non-ionic surface active agent selected from the group consisting of polyoxyethylene derivatives of alkyl phenols, polyoxyethylene derivatives of alkyl glycols, and polyoxyethylene derivatives of anhydroalkitol esters in a concentration adequate to disperse the calcium soap in the drilling fluid.

2. A drilling fluid as set forth in claim 1 in which the non-ionic surface active agent is a polyoxyethylene derivative of nonyl phenol.

3. A drilling fluid as set forth in claim 1 in which the non-ionic surface active agent is a polyoxyethylene derivative of polypropylene glycol.

4. A drilling fluid as set forth in claim 1 in which the non-ionic surface active agent is a polyoxyethylene derivative of a sorbitan ester of tall oil.

5. A water base drilling fluid having extreme pressure lubricating properties consisting essentially of water, clay solids and extreme pressure lubricant additives selected from the group consisting of fatty acids having at least eight carbon atoms per molecule, sulfurized fatty acids having at least eight carbon atoms per molecule, alkali metal soaps of said fatty acids and alkali metal soaps of said sulfurized fatty acids, available calcium ions of concentrations above about 150 parts per million, and a non-ionic surface active agent selected from the group consisting of polyoxyethylene derivatives of alkyl phenols, polyoxyethylene derivatives of alkyl glycols, and polyoxyethylene derivatives of anhydroalkitol esters in concentrations up to about 0.2 to 2 pounds per barrel of drilling fluid effective to disperse calcium soaps in the drilling fluid.

6. A water base drilling fluid having extreme pressure lubricating properties consisting essentially of water, a fatty acid having at least eight carbon atoms per molecule in concentrations between about 0.25 and 3.0% by volume of the drilling mud effective to impart extreme pressure lubricating characteristics to the drilling mud, calcium ions in a concentration of above about 150 parts per million effective to form insoluble curds of calcium soap, and a non-ionic surface active segent selected from the group consisting of polyoxyethylene derivatives of alkyl phenols, polyoxyethylene derivatives of alkyl glycols, and polyoxyethylene derivatives of anhydroalkitol esters in a concentration in the range of about 0.2 to 2 pounds per barrel to disperse the calcium soap in the drilling fluid.

7. A water base drilling fluid having extreme pressure lubricating properties consisting essentially of water, an alkali metal soap of a fatty acid having at least eight carbon atoms per molecule in concentrations between about 0.25 and 3.0% by volume of the drilling mud effective to impart extreme pressure lubricating characteristics to the drilling mud, calcium ions in a concentration of above about 150 parts per million effective to form insoluble curds of calcium soap, and a non-ionic surface active agent selected from the group consisting of polyoxyethylene derivatives of alkyl phenols, polyoxyethylene derivatives of alkyl glycols, and polyoxyethylene derivatives of anhydroalkitol esters in a concentration in the range of about 0.2 to 2 pounds per barrel to disperse the calcium soap in the drilling fluid.

8. In a rotary method for drilling a well through calcium-containing formations in which a water base drilling fluid is circulated down the well and back to the surface, a method of increasing the life of drill bits which comprises incorporating in the drilling fluid an extreme pressure lubricant additive selected from the group consisting of fatty acids having at least eight carbon atoms per molecule, sulfurized fatty acids having at least eight carbon atoms per molecule, alkali metal soaps of such fatty acids and alkali metal soaps of such sulfurized fatty acids in concentrations in the range of 0.25 to 3% by volume of the drilling fluid whereby insoluble calcium soap is formed, incorporating in the drilling fluid a non-ionic surface active agent selected from the group consisting of a non-ionic surface active agent selected from the group consisting of polyoxyethylene derivatives of alkyl phenols, polyoxyethylene derivatives of alkyl glycols, and polyoxyethylene derivatives of anhydroalkitol esters in concentrations up to about 0.2 to 2 pounds per barrel of drilling fluid adequate to disperse the calcium soap in the drilling fluid, and contacting the drill bits with the drilling fluid having the calcium soaps dispersed therein.

References Cited in the file of this patent

UNITED STATES PATENTS

| | | |
|---|---|---|
| 2,257,750 | Lincoln et al. | Oct. 7, 1941 |
| 2,413,220 | Elder et al. | Dec. 24, 1946 |
| 2,468,658 | Dyke et al. | Apr. 25, 1947 |
| 2,474,325 | Rodgers et al. | June 28, 1949 |
| 2,773,030 | Tailleur | Dec. 4, 1956 |

OTHER REFERENCES

Burdyn et al.: That New Drilling Fluid for Hot Holes—article in The Oil and Gas Journal, September 10, 1956, pages 104 to 107.